United States Patent [19]

Ott

[11] Patent Number: 4,671,661

[45] Date of Patent: Jun. 9, 1987

[54] PROCESS, APPARATUS AND COLOR MEASURING STRIP FOR EVALUATING PRINT QUALITY

[75] Inventor: Hans Ott, Regensdorf, Switzerland

[73] Assignee: Gretag Aktiengesellschaft, Regensdorf, Switzerland

[21] Appl. No.: 683,564

[22] Filed: Dec. 19, 1984

[30] Foreign Application Priority Data

Dec. 19, 1983 [CH] Switzerland ........................ 6748/83

[51] Int. Cl.[4] ............................................ G01J 3/50

[52] U.S. Cl. .................................. 356/402; 235/454; 250/226; 250/566

[58] Field of Search ............... 101/179, 180, 211, 221, 101/222; 235/454, 462; 250/226, 566, 568; 356/402, 407, 421, 422, 423, 424, 425; 364/526

[56] References Cited

U.S. PATENT DOCUMENTS

| | | | |
|---|---|---|---|
| 3,350,545 | 10/1967 | Street | 235/454 |
| 3,731,063 | 5/1973 | Bickl et al. | 235/454 |
| 3,757,091 | 9/1973 | Baker | 235/454 |
| 3,890,048 | 6/1975 | Abbondio et al. | 356/199 |
| 3,995,958 | 12/1976 | Pfahl et al. | 356/425 |
| 4,003,660 | 1/1977 | Christie, Jr. et al. | 356/407 |
| 4,289,405 | 9/1981 | Tobias | 356/407 |
| 4,469,025 | 9/1984 | Loffler et al. | 356/421 |
| 4,494,875 | 1/1985 | Schramm et al. | 356/425 |

FOREIGN PATENT DOCUMENTS

| | | | |
|---|---|---|---|
| 2658659 | 6/1978 | Fed. Rep. of Germany | 235/454 |
| 3220093 | 1/1983 | Fed. Rep. of Germany . | |

*Primary Examiner*—F. L. Evans

*Attorney, Agent, or Firm*—Burns, Doane, Swecker & Mathis

[57] ABSTRACT

A color measuring strip having a plurality of different measuring fields includes information codes located either laterally adjacent to, or between, individual measuring fields. The information codes are individually assigned to respective measuring fields, and contain information relating to such items as scanning position and the color and type of the field concerned. The information codes are machine-read and are evaluated so that a scanning head may be positioned relative to the measuring fields, and are further used in processing the data provided by the scanning head.

25 Claims, 7 Drawing Figures

PROCESS, APPARATUS AND COLOR MEASURING STRIP FOR EVALUATING PRINT QUALITY

BACKGROUND OF THE INVENTION

This invention relates to a process and apparatus for evaluating the print qualty of a printed product by means of a color measuring strip having individual measuring fields printed together with the printed product, and to the color measuring strip used in such process and apparatus.

One of the methods for evaluating print quality involves printing, together with the product, a color measuring strip constructed of a series of measuring fields of different types and colors, and then evaluating it colorimetrically. Densitometric measurement of the color measuring strips may be effected off-line by manual densitometers or by an automatic scanning densitometer, or on-line during operation of the printing machine by means of machine densitometers. Suitable scanning densitometers are described in U.S. patent application Ser. No. 363,538, filed Mar. 30, 1982, U.S. Pat. Nos. 3,995,958, and 4,289,405, among others, while examples of machine densitometers are found in U.S. Pat. Nos. 3,376,426 and 3,390,447, among others.

The scanning densitometer system described in U.S. Pat. No. 4,289,405 uses manually-applied markers in the determination of measuring positions of the measuring fields to be scanned. Aside from the fact that this system is not transferable to machine densitometers, information other than position information must be acquired by other, complicated means from the color measuring strips themselves, which in practice is difficult as well as expensive.

OBJECTS AND BRIEF SUMMARY OF THE INVENTION

In performing machine measurements of color measuring strips, therefore, among the most difficult problems which must be overcome is the precise determination of suitable measuring positions, as well as the detection of both the color and type of individual measuring strips. Accordingly, it is an object of the present invention to solve these problems, among others.

Briefly, the process of the present invention includes attaching or otherwise assigning in a predetermined spatial relationship a machine-readable information code to each of the measuring fields of the color measuring strips. This code is read in the course of the evaluation and yields the types of information required for such evaluation. These primarily include information concerning the type and color of the measuring field, adjusting information pertaining to the relative position of the reading track with respect to the measuring field and testing information so that reading errors can be recognized.

An apparatus according to the present invention includes means for measuring a color measuring strip by a densitometer, means for colorimetrically analyzing the color strip, wherein a machine-readable information code is assigned to each of the measuring fields of the color measuring strips and is printed in a predetermined spatial relation with a respective measuring field, and further includes scanning head means displaceable along a track for photoelectrically measuring the individual measuring fields of the color measuring strip, electronic control system means connected to the scanning head means for controlling the moving and measuring functions of the scanning head means and for evaluating the data determined by the scanning head means, reading head means for reading the information codes assigned to the measuring fields, and code reading interface means for connecting the electronic control system means with the reading head means and for transmitting the information read to the electronic control system means.

A color measuring strip according to the present invention includes a plurality of different measuring fields for evaluating the print quality of a printed product, wherein a machine-readable information code is assigned to each of the individual measuring fields. The information code may contain one or more types of information, including such information relating to position, type and color as were discussed above.

Other objects and advantages of the present invention can be recognized by a reference to the appended claims.

BRIEF DESCRIPTION OF THE DRAWINGS

The present invention will become more apparent to one skilled in the art to which it pertains from the following detailed description when read with reference to the drawings, in which.

DETAILED DESCRIPTION

Figure 1:
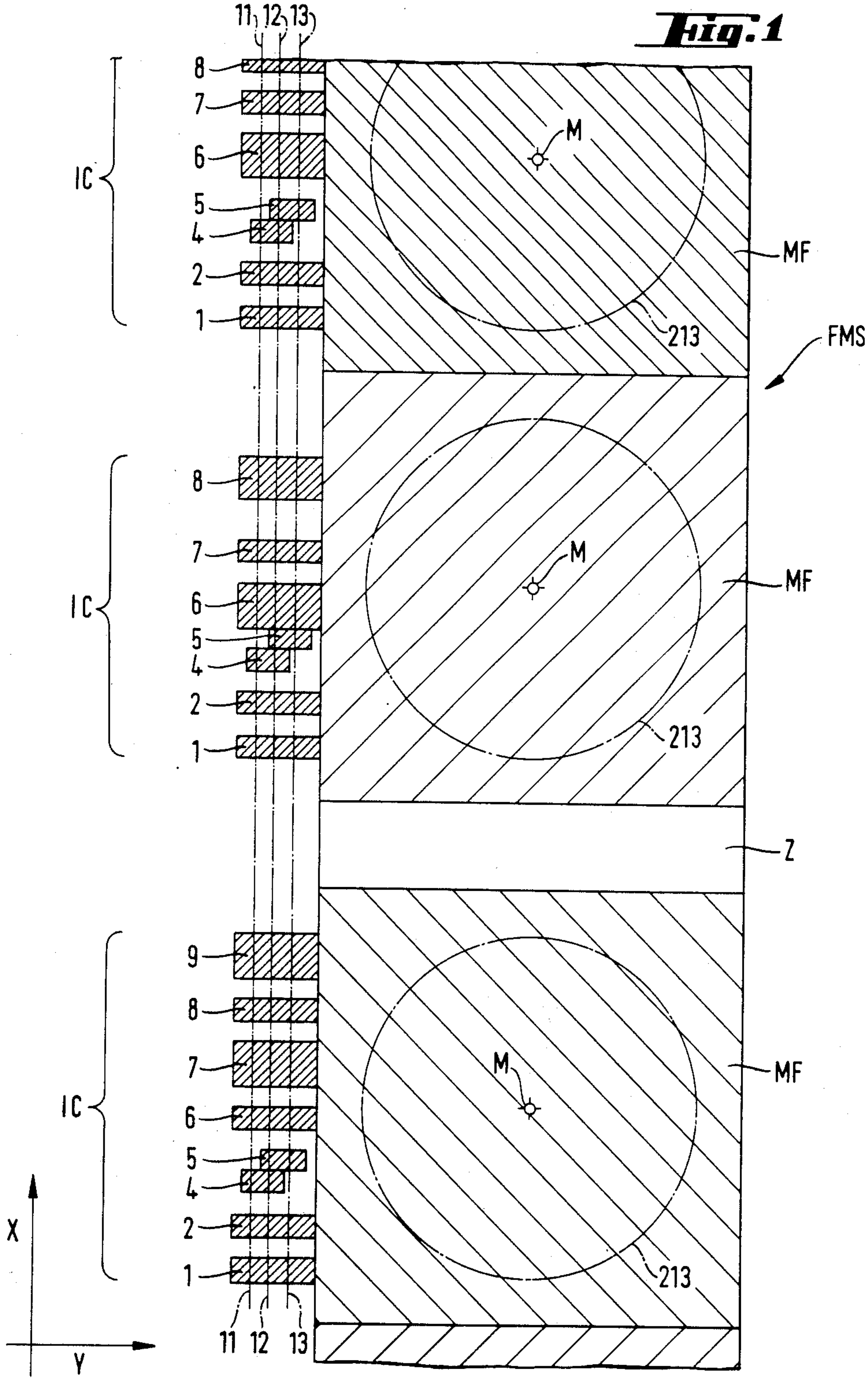
FIG. 1 is an enlarged detail view in plan of a portion of one embodiment of a color measuring strip of the present invention, in which an information code is located laterally adjacent to an associated measuring field, as viewed in the longitudinal direction of the color measuring strip.

A color measuring strip FMS, as shown in FIG. 1, is intended for use in off-line evaluation using an automatic scanning densitometer. As shown in FIG. 1, the longitudinal direction of the color measuring strip is designated by "X", and the direction transverse to it is designated by "Y". The color measuring strip FMS includes a plurality of color measuring fields MF, which are usually different and which are either separated by interstices Z, or are directly adjacent to one another. An information code IC is assigned to each of the measuring fields MF, and is located laterally adjacent to each respective measuring field. The information code IC is in the form of a bar or line code having a reading or scanning direction in the X direction, which coincides with the direction of movement of a scanning densitometer scanning head which scans the measuring fields MF, and which is shown as 21 in FIGS. 3 and 4. The operation of the scanning head 21 will be described later in greater detail.

Each information code IC includes a group of a plurality of fixed and variable code elements in the form of lines or bars, with information being contained in the bar width and spacing. The first two code elements 1 and 2 in the reading direction are of fixed or unchanging widths and spacing relative to successive code groups, and become start or margin symbols containing information pertaining to the position of the measuring field MF in the X direction with respect to a center M of the measuring field.

Figure 4:
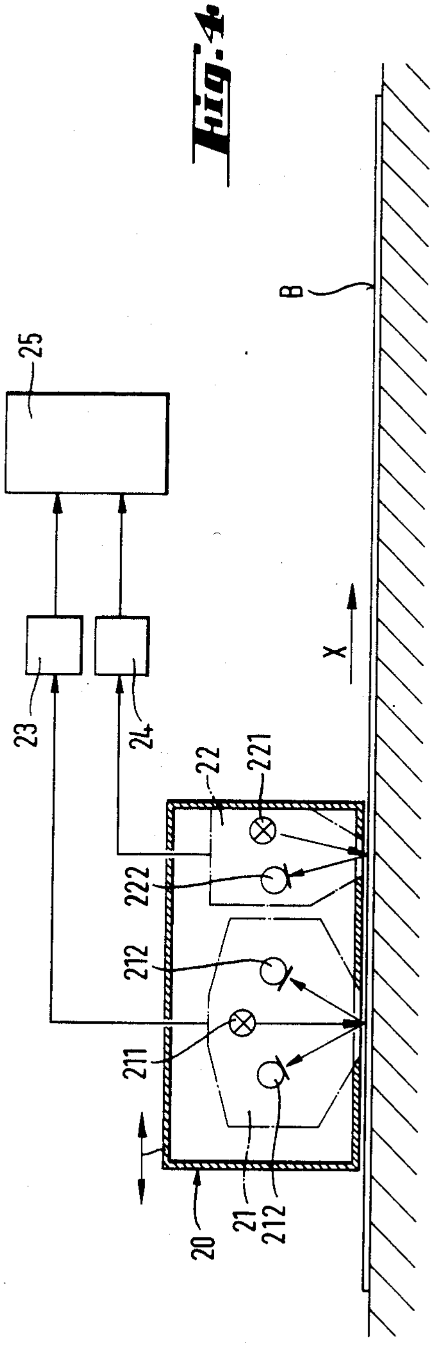
FIG. 4 is a side elevational orthagonal schematic diagram of the portion shown in FIG. 3 of a scanning densitometer according to the present invention.
Figure 3:
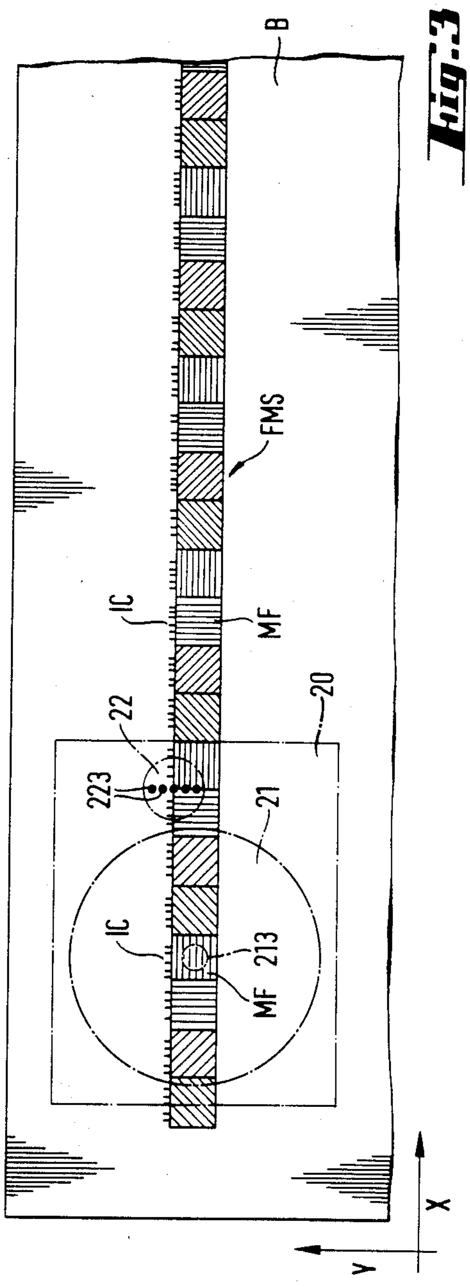
FIG. 3 is a top plan schematic diagram of the portion of a scanning densitometer according to the present invention.

The next two code elements 4 and 5 are also fixed, and contain position information relative to the center M of the measuring field MF with respect to the Y direction, i.e. transverse to the reading or scanning direction. These code elements 4 and 5 are designed so that position information can be obtained while the scanning head 21 reads along such reading tracks as are shown by the dash-and-dot lines 11, 12 and 13 in FIG. 1, which reading tracks are differentially spaced predetermined distances from the center M of the measuring field MF. The information obtained by reading or scanning along the reading tracks is based upon the fact that the position of a code reading head 22 is fixed relative to that of the scanning head 21, which in turn is fixed relative to the center M of the measuring fields MF, as shown in FIGS. 3 and 4. Thus it will be appreciated that the relative position of the scanning head 21 can be determined and adjusted based upon reading along such differentially spaced reading tracks 11, 12 and 13. The operation of code reading head 22 will be discussed later in greater detail.

The other code elements 6, 7, 8 and 9 shown in FIG. 1 are of variable width and spacing relative to successive code groups, and contain quality information indicating the color as well as the type (fulltone, halftone, etc.) of a respective associated measuring field MF. In addition to the types of information discussed above, information code IC may further contain testing information for recognizing reading errors, as well as information pertaining to the distances separating successive subsequent measuring fields, the center of the machine and printing machine zones.

Figure 2:
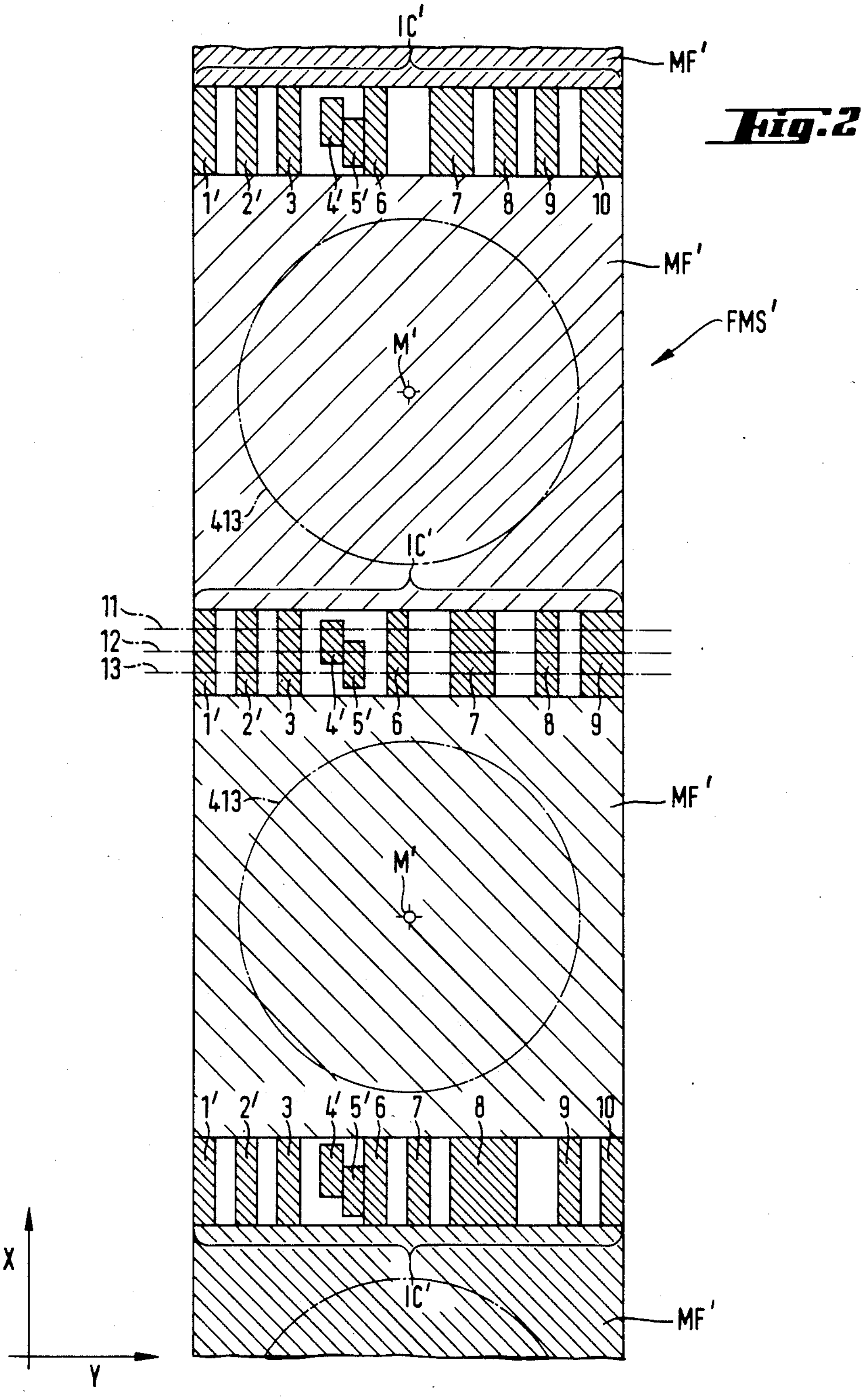
FIG. 2 is an enlarged detail view in plan of a portion of another embodiment of a color measuring strip of the present invention, in which an information code is located between, and adjacent to, successive measuring fields, as viewed in the longitudinal direction of the color measuring strip.
Figure 6:
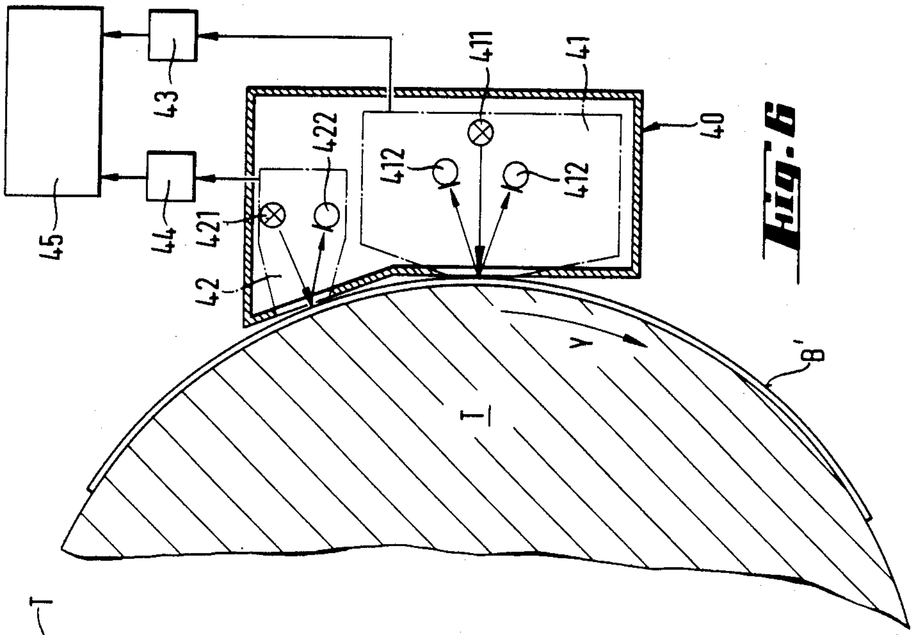
FIG. 6 is a side elevational orthagonal schematic diagram of the portion shown in FIG. 5 of the machine densitometer according to the present invention.
Figure 5:
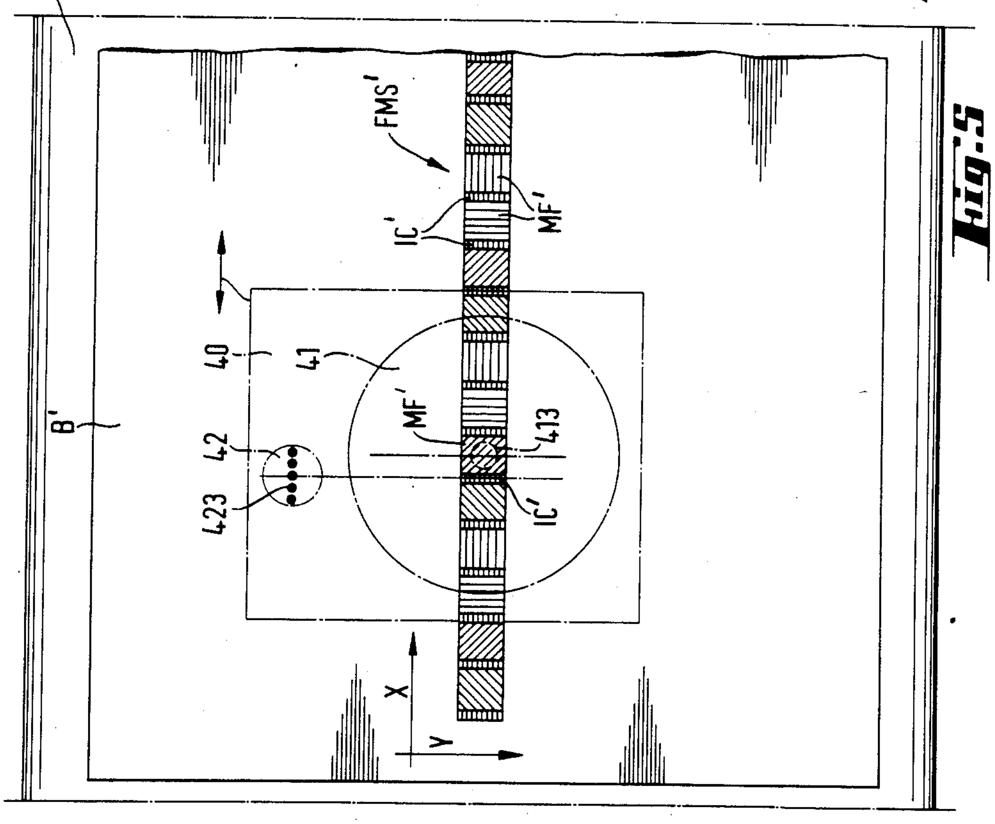
FIG. 5 is a top plan schematic diagram of the portion of a machine densitometer according to the present invention.

A color measuring strip FMS' as shown in FIG. 2 is intended for use in on-line measurements or evaluation using machine densitometers on an operating machine. In this embodiment of color measuring strip FMS' of the present invention, the information codes IC' are not located laterally adjacent to each measuring fields MF', but instead are located between successive measuring fields in the longitudinal direction of the strip, in front of or after a respective associated measuring field MF'. As shown in FIGS. 5 and 6, the reading direction is obtained by relative motion between a stationary reading head 42 and a curved drum T of the printing machine (not shown) or a separate measuring apparatus, and is thus transverse to the longitudinal direction X of the strip FMS'. The configuration of the information code IC' is basically the same as that of the embodiment shown in FIG. 1, but certain codes IC' also possess an additional fixed code element 3 and an additional variable code element 10. As shown in FIG. 2, the fixed code elements 1', 2' and 3' define the position information in the Y direction; the fixed code elements 4' and 5' provide information concerning the track location and position, respectively, in the X direction; and the variable code elements 6, 7, 8, 9 and 10 contain quality information pertaining to the color and type of the measuring field MF', testing information, and other information as discussed above concerning the embodiment shown in FIG. 1.

Having described two embodiments of the color measuring strip of the present invention, it is now appropriate to describe the apparatus used to obtain information from each of these two embodiments.

The scanning densitometer used in conjunction with the embodiment shown in FIG. 1 is similar in principle to that described in the aforecited allowed U.S. patent application Ser. No. 363,538, filed Mar. 30, 1982, now U.S. Pat. No. 4,505,589, which is incorporated herein by reference. The scanning densitometer of the present invention differs from that described in said U.S. patent application Ser. No. 363,538, primarily in that it also includes reading head means for reading the information code, and corresponding code reading interface means for connecting the reading head means with computer-effected electronic control system means for controlling the moving and measuring functions of scanning head means, and for evaluating or processing the data read or determined by the scanning head means. Accordingly, as shown in FIGS. 3 and 4, a slide 20 is arranged on a bridge (not shown) over a printed sheet B, on which the color measuring strip FMS is printed together with its measuring fields MF and the associated information codes IC according to the embodiment shown in FIG. 1, so that the slide can be displaced along the color measuring strip. The slide 20 contains scanning head means, including the scanning head 21, for scanning measuring fields MF, and reading head means, including reading head 22, for reading the information codes IC, in a fixed spatial arrangement with respect to the scanning head. The scanning head 21 includes a light source 211 and light receivers 212 and, as shown in FIGS. 1 and 3, produces a circular measuring spot 213 on the printed sheet B. The reading head 22 includes several (for example, five) light sources 221 and a corresponding number of light receivers 222, and produces five scanning light spots 223 on the printed sheet B located transverse to the longitudinal direction of the color measuring strip FMS (in the Y direction). Thus the reading head 22 scans the information code IC over five different tracks.

The scanning head 21 and the reading head 22 are connected by means of a corresponding interface means, including interfaces 23 and 24, respectively, with an electronic control system means 25. The electronic control system means 25 controls all of the movements of the slide 20, all measuring functions of the scanning and reading heads 21 and 22, and processes the scanning and reading data. Details of the electronic control system means 25 are described in the aforecited U.S. patent application Ser. No. 363,538, and it thus requires no further explanation.

In operation, the slide 20 moves along the color measuring strip and in the process, the scanning head 21 scans the individual measuring fields MF. The reading head 22, offset with respect to the scanning head 21 for reasons of space, reads the information codes of the successive measuring fields while leading the scanning head in time. By making multiple readings of the information codes IC in several parallel tracks, it is possible to keep the size of the information codes relatively small (approx. 1 mm), so that at least in one of the scanning tracks, the code will be read free of error. The information from the individual scanning tracks is analyzed, and the track position and the exact location in the Y direction is determined from such analysis, by the electronic control system means 25.

The arrangement containing a machine densitometer used in conjunction with the embodiment shown in FIG. 2 is shown in FIGS. 5 and 6 and is similar to that for the scanning densitometer shown in FIGS. 3 and 4. Here, printed sheet B′ is located on a drum T that is part of the printing machine and rotates in the direction of the arrow Y, thereby moving the sheet B′ relative to a slide 40. This slide 40 includes scanning head means having a scanning head 41 for the measuring fields MF′, together with reading head means having a reading head 42 for information codes IC′ of color measuring strips FMS′ on the sheet B′. The scanning head 41 includes a source of light 411 and light receivers 412, and produces a measuring spot 413 on sheet B′. The slide 40 also supports reading head means including a reading head 42 having five light sources 421 and five light receivers 422, and which produces five corresponding scanning light spots 423 on the sheet B′, as shown in FIGS. 2 and 5. The scanning head 41 and the reading head 42 are connected by interface means, including interfaces 43 and 44, respectively, with electronic control system means 45 for controlling the motion and functional processes of the scanning head means and for processing the measuring and scanning data.

The slide 40 is displaceable in the X direction for movement parallel to the drum axis. The reading head 42 reads the information code IC′ belonging to a measuring field MF′ prior to the scanning of a corresponding respective measuring field MF′. This offset in time is caused by the spatial offset of the scanning head 41 relative to the reading head 42 and by the circumferential velocity of the drum T. The evaluation of the information read by the reading head 42 makes it possible to accurately laterally position the scanning head 41 in the X direction, and optionally, to make an optimum in-motion correction in the X direction to the next measuring field to be scanned.

Figure 7:
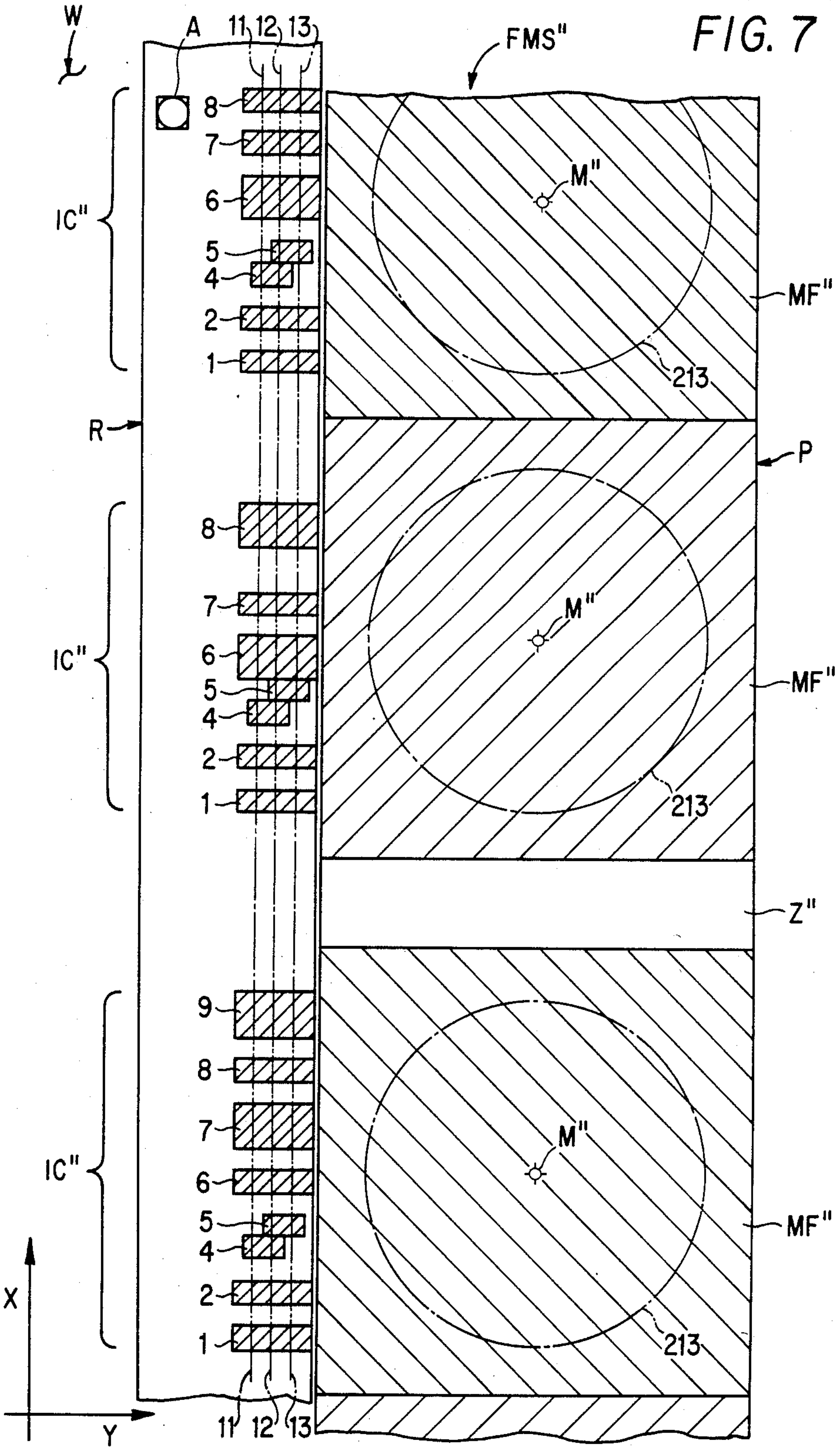
FIG. 7 is an enlarged detail view in plan of a portion of yet another embodiment of a color measuring strip of the present invention, in which the strip includes two separate parts, one part including measuring fields and the other part including the associated information codes, which other part is in the form of a code template or code ruler.

In the embodiments of the present invention which have been previously described, the respective information codes IC, IC′ are integral components of the color measuring strips FMS, FMS′, in that the codes are printed together with the product in exactly the same manner as are the color measuring fields MF, MF′. However, it is also possible to print the color measuring fields alone and to design the information code in the form of a template or code ruler. This embodiment is illustrated in FIG. 7, in which a color measuring strip FMS″ is formed in two parts, namely a template or code ruler R and a color measuring field portion P. As shown in FIG. 7, the code ruler R contains the same format for an information code IC″ as is present in the previously-described embodiments. The code ruler R also may include aligning means A for mounting the code ruler on a table or worksurface W, in alignment with the color measuring field portion P. The color measuring field portion P includes the same elements as are present in the embodiment shown, for example, in FIG. 1, such as measuring fields MF″, measuring spot 213, centers M″ and interstices Z″.

In operation, the template or code ruler R is mounted on worksurface W in alignment with color measuring fields portion P so that each of the information codes IC″ is in a predetermined spatial relationship with a respective measuring field MF″. Then the template or code ruler R is used exactly as were the information codes IC of the embodiment shown in FIG. 1. It can be appreciated that every color measuring strip FMS″ requires its own individual code template or ruler R.

The principles, preferred embodiments and modes of operation of the present invention have been described in the foregoing specification. The invention which is intended to be protected herein, however, is not to be construed as limited to the particular forms disclosed, since these are to be regarded as illustrative, rather than restrictive. Variations and changes may be made by those skilled in the art without departing from the spirit of the invention.

What is claimed is:

1. A process for evaluating the print quality of a printed product by means of a color measuring strip having individual measuring fields printed together with the printed product, comprising the steps of: assigning a machine-readable information code to each of the measuring fields of the color measuring strip, said code being printed in a predetermined spatial relation with a respective measuring field, reading the information codes, and measuring in a densitometer, and colorimetrically analyzing, said color measuring strip utilizing the information obtained by said reading of said information codes.

2. A process for evaluating the print quality of a printed product by means of a color measuring strip having individual measuring fields printed together with the printed product, comprising the steps of: assigning a machine-readable information code to each of the measuring fields of the color measuring strips, said codes being in the form of a code ruler, aligning said code ruler adjacent to, and in a predetermined spatial relation with, said measuring strip, reading the information codes, and measuring via a densitometer, and colorimetrically analyzing, said color measuring strip utilizing the information obtained by said reading of said information codes.

3. An apparatus for the evaluation of the print quality of a printed product by means of a color measuring strip having individual measuring fields that are printed together with the printed product, comprising:

- scanning head means that is selectively movable, wherein said scanning head means includes a densitometer for photoelectrically measuring said measuring fields of said color measuring strip;
- reading head means for reading information codes which are assigned to each of said measuring fields, are applied in a machine-readable form to said printed product, and are printed in a predetermined spatial relation with said fields;
- electronic control system means connected to the scanning head means for controlling the moving and measuring functions of the scanning head means and for colorimetrically analyzing the color measuring strip by considering the measurements made by said scanning head means and information read by said reading head means; and code reading interface means for connecting the electronic control system means with the reading head means and for transmitting the information read by said reading head means to the electronic control system means.

4. An apparatus according to claim 3, wherein: the information codes are read in a predetermined reading direction, the reading head means includes a plurality of readers spatially offset with respect to the reading direction, and said readers reading the information code in a plurality of parallel tracks.

5. A color measuring strip, comprising: a plurality of measuring fields for evaluating the print quality of a printed product wherein a machine-readable information code is disposed in a predetermined spatial relationship with each of the individual measuring fields to carry information used in the analysis of the fields.

6. A color measuring strip according to claim 5, wherein the information code contains quality information indicating the type of the associated measuring field.

7. A color measuring strip according to claim 5, wherein the information code contains position information relating to the optimum measuring location in the associated measuring field.

8. A color measuring strip according to claim 7, wherein the information code is read along a code reading track, and wherein the information code further contains adjusting information relating to the instantaneous position of the code reading track relative to the measuring field.

9. A color measuring strip according to claim 7, wherein the information code further contains quality information indicating the type of the associated measuring field.

10. A color measuring strip according to claim 9, wherein the information code is read along a code reading track, and wherein the information code further contains adjusting information relating to the instantaneous position of the code reading track relative to the measuring field.

11. A color measuring strip according to claim 5, wherein the information code is located laterally adjacent to the associated measuring field as viewed in the longitudinal direction of the strip.

12. A color measuring strip according to claim 11, wherein the information code is in the form of a bar code.

13. A color measuring strip according to claim 5, wherein the information code is located between, and adjacent to, successive measuring fields, as viewed in the longitudinal direction of the strip, and pertains to at least one of said adjacent successive measuring fields.

14. A color measuring strip according to claim 13, wherein the information code is in the form of a bar code.

15. A color measuring strip according to claim 5, wherein the information code contains testing information for recognizing reading errors.

16. A color measuring strip according to claim 5, wherein the strip includes two separate parts, one part including the measuring fields, and the other part including the associated information codes, and wherein the information codes being in the form of a code ruler.

17. A color measuring strip according to claim 10, wherein the information code is located laterally adjacent to the associated measuring field as viewed in the longitudinal direction of the strip.

18. A color measuring strip according to claim 17, wherein the information code is in the form of a bar code.

19. A color measuring strip according to claim 18, wherein the information code contains information for recognizing reading errors.

20. A color measuring strip according to claim 19, wherein the strip includes two separate parts, one part including the measuring fields, and the other part including the associated information codes, and wherein the information codes being contained in a code template.

21. A color measuring strip according to claim 10, wherein the information code is located between, and adjacent to, successive measuring fields, as viewed in the longitudinal direction of the strip, and pertains to at least one of said adjacent successive measuring fields.

22. A color measuring strip according to claim 21, wherein the information code is in the form of a bar code.

23. A color measurng strip according to claim 22, wherein the information code contains testing information for recognizing reading errors.

24. A color measuring strip according to claim 23, wherein the strip includes two separate parts, one part including the measuring fields, and the other part including the associated information codes, and wherein the information codes being in the form of a code template.

25. A system for evaluating the print quality of a printed product by means of a color measuring strip having individual measuring fields printed together with the printed product comprising:

a machine-readable information code associated in a predetermined spatial relationship to each of said individual measuring fields on said color measuring strip;

scanning and reading head means for photoelectrically measuring each of the individual measuring fields of the color measuring strip and for reading information from the information codes associated with said fields; and electronic control system means connected to said scanning and reading head means for evaluating the photoelectric measurements of the individual measuring fields using information read from said information codes.

* * * * *